(12) United States Patent
Wallach et al.

(10) Patent No.: US 12,478,960 B2
(45) Date of Patent: Nov. 25, 2025

(54) SOLID STATE ION SELECTIVE ELECTRODES

(71) Applicant: Beckman Coulter, Inc., Brea, CA (US)

(72) Inventors: John M. Wallach, Diamond Bar, CA (US); Xihai Mu, Eastvale, CA (US)

(73) Assignee: Beckman Coulter, Inc., Brea, CA (US)

(*) Notice: Subject to any disclaimer, the term of this patent is extended or adjusted under 35 U.S.C. 154(b) by 156 days.

(21) Appl. No.: 17/144,624

(22) Filed: Jan. 8, 2021

(65) Prior Publication Data

US 2021/0213442 A1    Jul. 15, 2021

Related U.S. Application Data

(60) Provisional application No. 62/960,239, filed on Jan. 13, 2020.

(51) Int. Cl.
*G01N 27/403* (2006.01)
*B01L 3/00* (2006.01)
(Continued)

(52) U.S. Cl.
CPC .......... *B01L 3/502* (2013.01); *G01N 27/4035* (2013.01); *G01N 33/48707* (2013.01);
(Continued)

(58) Field of Classification Search
CPC ............... B01L 3/502; B01L 2200/026; B01L 2200/0689; B01L 2300/0645;
(Continued)

(56) References Cited

U.S. PATENT DOCUMENTS 3,616,409 A    10/1971    Tosteson
4,211,623 A    7/1980    Amass et al.
(Continued)

FOREIGN PATENT DOCUMENTS

CN    109991293    7/2021
WO    WO 2014125457 A1    8/2014
WO    WO 2019094966 A1    5/2019

OTHER PUBLICATIONS

International Search Report and Written Opinion for PCT/US21/12657, dated May 31, 2021, 15 pages.

*Primary Examiner* — Matthew D Krcha
*Assistant Examiner* — Sophia Y Lyle
(74) *Attorney, Agent, or Firm* — Frost Brown Todd LLP

(57) ABSTRACT

An ion selective electrode ("ISE") assembly may be installed within a sample path of a biological testing system to measure ion concentration within sample fluid flowing through the sample path. A transducer membrane is placed within a housing and positioned to contact the sample path. A threaded portion is advanced into a socket of the housing and forces the membrane against a sealing portion of the sample path to prevent retention of sample fluid within the housing after testing. Sealing may be accomplished without adhesives or sealants and instead relies upon mechanical pressure of the threaded portion. Another implementation includes a reference measuring electrode and several ion measuring electrodes combined into a single housing. Another implementation includes a reference measuring electrode and several ion measuring electrodes combined into a cartridge that includes a sample well instead of a sample path.

6 Claims, 13 Drawing Sheets

(51) Int. Cl.
*G01N 33/487* (2006.01)
*G01N 33/84* (2006.01)

(52) U.S. Cl.
CPC ........ *G01N 33/84* (2013.01); *B01L 2200/026* (2013.01); *B01L 2200/0689* (2013.01); *B01L 2300/0645* (2013.01); *B01L 2300/0861* (2013.01)

(58) Field of Classification Search
CPC ........ B01L 2300/0861; G01N 27/4035; G01N 33/48707; G01N 33/84; G01N 27/301; G01N 27/283; G01N 27/333
See application file for complete search history.

(56) References Cited

U.S. PATENT DOCUMENTS

| | | | |
|---|---|---|---|
| 4,431,508 A | 2/1984 | Brown et al. | |
| 4,627,893 A | 12/1986 | Cormier et al. | |
| 5,393,391 A * | 2/1995 | Dietze | G01N 27/4165 |
| | | | 205/793 |
| 5,505,836 A | 4/1996 | Miyahara et al. | |
| 5,552,032 A | 9/1996 | Xie et al. | |
| 2002/0038762 A1 | 4/2002 | Eventov et al. | |
| 2003/0201192 A1* | 10/2003 | Prince | G01N 33/48785 |
| | | | 205/792 |
| 2005/0183494 A1* | 8/2005 | Tess | C12Q 1/004 |
| | | | 73/53.01 |
| 2008/0264788 A1 | 10/2008 | Uthemann et al. | |
| 2010/0243480 A1 | 9/2010 | Jiang et al. | |
| 2011/0000796 A1* | 1/2011 | Situ | G01N 33/4915 |
| | | | 204/435 |
| 2011/0023586 A1 | 2/2011 | Leyer et al. | |
| 2012/0175253 A1 | 7/2012 | Kobayashi et al. | |
| 2013/0168247 A1* | 7/2013 | Iwamoto | G01N 27/333 |
| | | | 204/417 |
| 2014/0105788 A1* | 4/2014 | Iwamoto | G01N 27/27 |
| | | | 422/82.02 |
| 2014/0125457 A1 | 5/2014 | Rushing | |
| 2015/0338367 A1 | 11/2015 | Hu et al. | |
| 2016/0223486 A1 | 8/2016 | Ishige et al. | |
| 2017/0199148 A1* | 7/2017 | Berney | G01N 27/4148 |
| 2018/0180566 A1 | 6/2018 | Nakazato | |

* cited by examiner

SOLID STATE ION SELECTIVE ELECTRODES

BACKGROUND

Various types of tests related to patient diagnosis and therapy can be performed by analysis of the patient's microorganisms, or "microbes." Microbes are microscopic living organisms such as bacteria, fungi, or viruses, which may be single-celled or multicellular. Biological samples containing the patient's microorganisms may be taken from a patient's infections, bodily fluids or abscesses and may be placed in test panels or arrays, combined with various reagents, incubated, and analyzed to aid in treatment of the patient. Automated biochemical analyzers or biological testing systems have been developed to meet the needs of health care facilities and other institutions to facilitate analysis of patient samples and to improve the accuracy and reliability of assay results when compared to analysis using manual operations and aid in determining effectiveness of various antimicrobials.

Such biological testing systems may include the use of ion selective electrodes to determine the ionic concentrations within a biological sample. This may include pumping a sample fluid through channels that pass through or near an ion selective electrode so that a sensing element is exposed to the sample fluid. The sensing element interacts with the fluid sample and generate an electrical voltage which can be measured to determine the concentration of a particular substance in the sample fluid (e.g., sodium, potassium, chloride).

These electrodes and corresponding systems are often expensive, have long response times, and/or require a large sample size. Additionally, many ion selective electrodes can have insufficient sealing between the conductive core and the ion selective membrane. This can create an occurrence, often called "carryover," in which the sample remains within the instrument after analysis such that subsequent analyses of other samples are inaccurate and unreliable.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
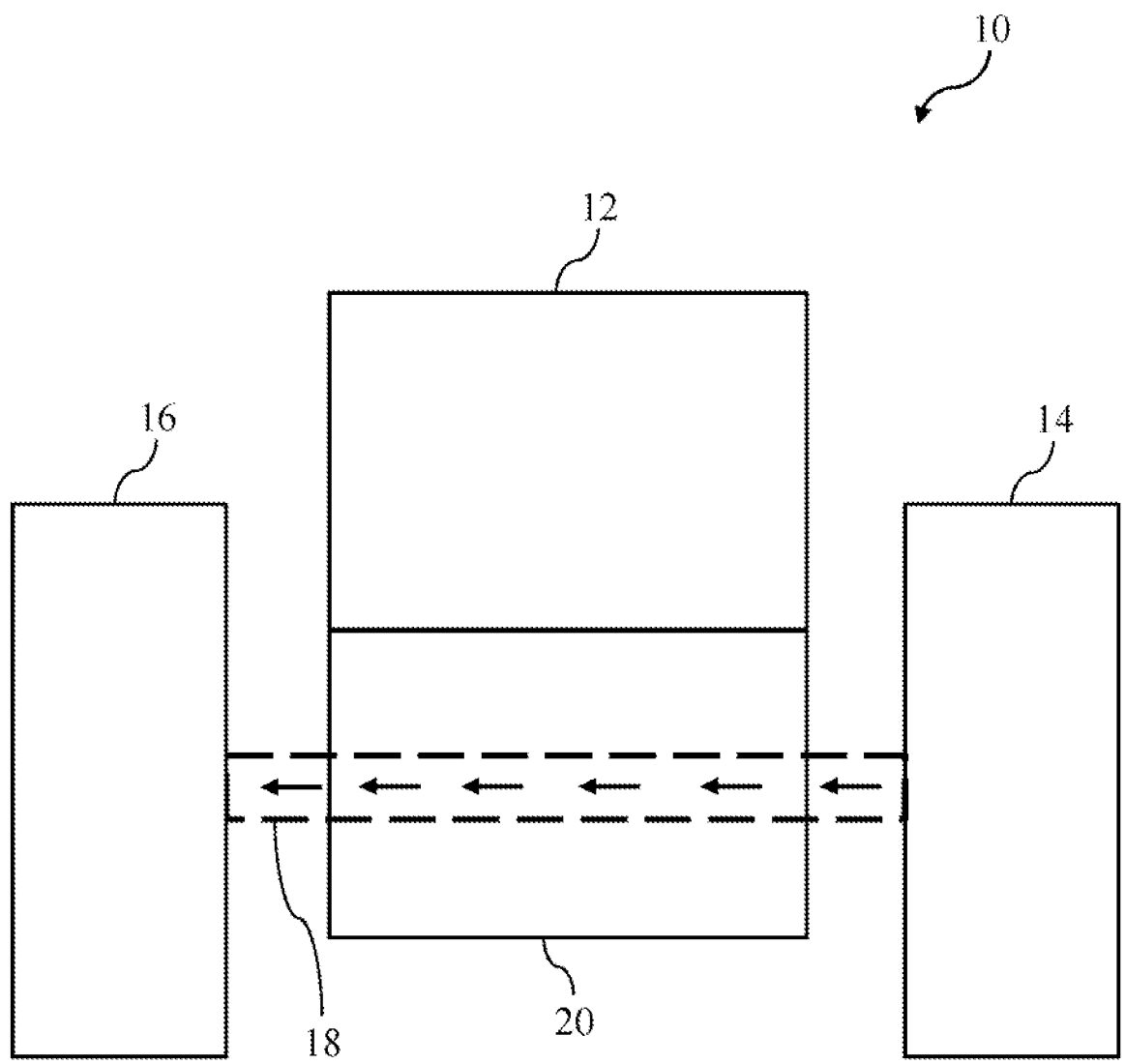
FIG. 1 is a schematic diagram of an exemplary biological testing system.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

It will be appreciated that any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

As has been described, many conventional ion selective electrodes ("ISE") are disadvantageous due to various factors. Some conventional ISEs are relatively complex, which can impact cost and reliability. Some conventional ISEs may also use adhesives to affix or seal various components, which can contaminate sample fluid and cause erroneous measurements, or can degrade over time and limit shelf life or increase the risk of carryover. Many conventional ion selective electrodes may also suffer from slow response time and may require exposure to relatively large quantities of sample in order to provide accurate results. The implementations disclosed herein, as well as variations thereof, provide numerous advantages over conventional ISEs.

I. Exemplary Ion Selective Electrode Assembly

FIG. 1 is a schematic diagram of an exemplary biological testing system (10). The biological testing system (10) includes a processor (12) that is configured to operate various components of the biological testing system (10), and that is also configured to receive and produce data associated with the results of biological testing. A sample source (14) is operable by the processor (12) to provide a flow of sample fluid that travels through a sample path (18) and exits at a sample disposal (16). The sample fluid may contain biological samples, reagents, and other fluids and may be prepared prior to being introduced to the biological testing system (10) or, in some implementations, may be mixed and prepared by components of the biological testing system (10). One or both of the sample source (14) and sample disposal (16) may include valves, pumps, and other fluid control components, or positive/negative fluid pressure may be provided by devices upstream or downstream of the sample path (18).

The sample path (18) is a fluid channel having varying lengths, paths, and characteristics depending upon a particular implementation of the biological testing system (10). For example, in some implementations, the sample path (18) may be a single path that transports sample fluid by or through one or more sensing elements (20). In some implementations, the sample path (18) may split or divert a flow of sample fluid to one or more paths. The sensing elements (20) are positioned along the sample path (18) in order to contact the sample fluid as it flows through the sample path (18) and determine one or more characteristics of the sample fluid. This could include, for example, the sample fluid passing through the sensing element (20), or the sensing element (20) projecting into the sample path (18). Determination of sample fluid characteristics may be performed in various ways and, in the case of ISEs, may include the measurement of voltage or other characteristics that is produced as a result of the sample fluid contacting the operative portion of the sensing element (20).

In some implementations, the processor (12) may operate the sample source (14) and/or the sample disposal (16) to control the flow of sample fluid along the sample path (18). As the sample fluid contacts the sensing element (20) a voltage is produced and received by the sensing element (20). The produced voltage may be transmitted to the processor (12), or data indicative of the voltage may be transmitted to the processor (12), and may be used by the processor (12) to produce results indicative of the concentration of ion in the sample fluid (e.g., sodium, potassium, chloride). Such results may then be transmitted to another device, stored on a memory, displayed on a display device, or otherwise used by the processor (12) as will be apparent to those of ordinary skill in the art in light of this disclosure.

Figure 2:
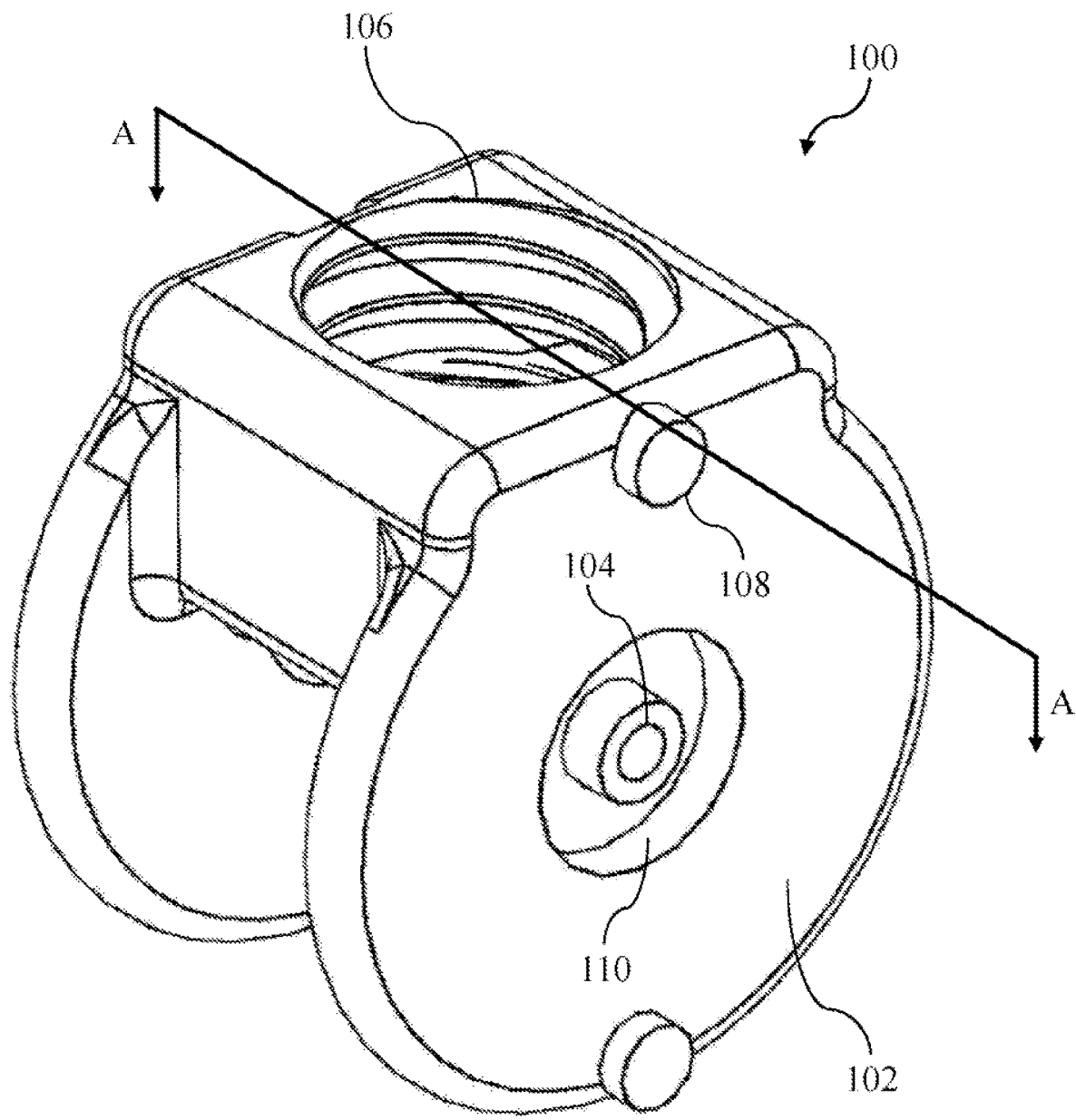
FIG. 2 is a perspective view of an exemplary ion selective electrode assembly with an electrode assembly removed.
Figure 6A:
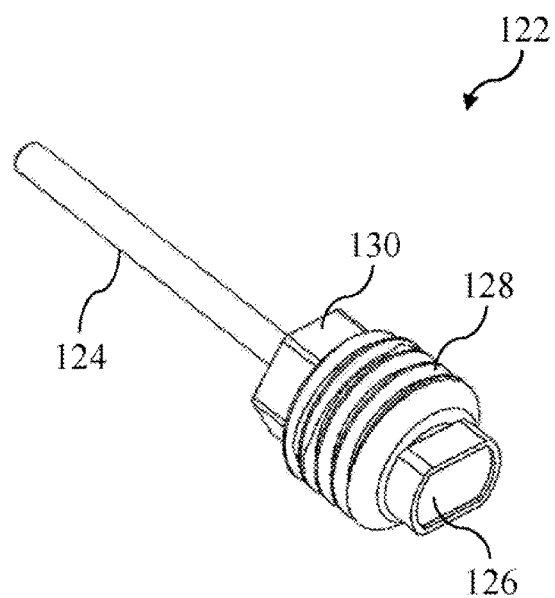
FIG. 6A is a perspective view of an exemplary transducer assembly usable with the ion selective electrode assembly of FIG. 2.
Figure 6B:
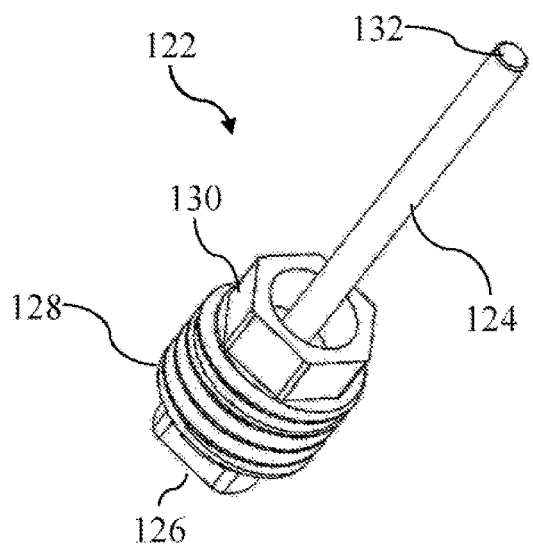
FIG. 6B is an alternate perspective view of the transducer assembly of FIG. 6A.

FIG. 2 is a perspective view of an exemplary ion selective electrode ("ISE") assembly (100) with a transducer assembly (e.g., a transducer assembly (122) as shown in FIGS. 6A and 6B) removed. The complete ISE assembly (100) may be used with the biological testing system (10) as a sensing element (20). The ISE assembly (100) may be installed within the biological testing system (10) such that the sample path (18) passes through the ISE assembly (100). The ISE assembly (100) includes a housing (102) that shaped and adapted to fit within a receiver portion of the biological testing system (10) in order to integrate the ISE assembly (100) with the sample path (18). The housing (102) may include features to aid in placement, such as a set of mounting tabs (108) which may align and insert into an appropriately sized void in a nearby structures. The housing (102) itself may also include contoured edges, grooves, and other external features that aid in placement and positioning.

A sample input (104) is positioned on the housing (102) such that it is aligned with a source of sample fluid (e.g., such as the sample source (14)) when the ISE assembly (100) is coupled with the biological testing system (10). A sample path seal (110) surrounds the sample input (104), and may couple with an opposing structure when the ISE assembly (100) is installed in the biological testing system (10) in order to aid in sealing between the sample source (14) and the sample input (104). The sample path seal (110) may also aid in proper installation of the ISE assembly (100), similarly to the mounting tabs (108). A transducer assembly socket (106) extends into the housing (102) and is shaped and adapted to receive the transducer assembly (122), as will be described in more detail below.

Figure 3:
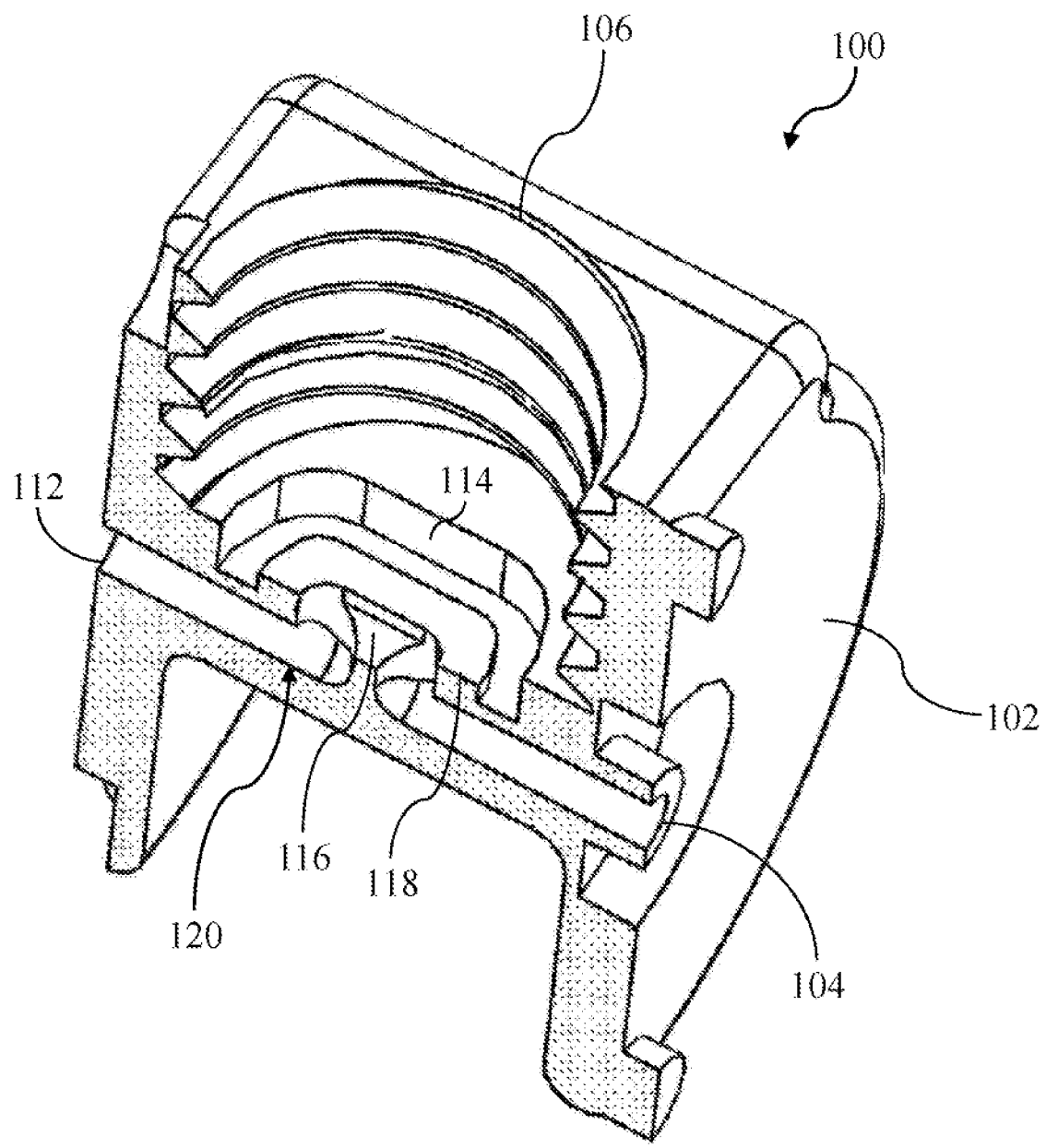
FIG. 3 is a cross sectional view along the line A-A of FIG. 2 of the ion selective electrode assembly.

FIG. 3 is a cross sectional view along the line A-A of FIG. 2 of the ion selective electrode assembly (100). In this view, it can be seen that the sample input (104) passes through the housing (102) and exits at a sample output (112), defining a sample path (120) within the housing (102). The transducer assembly socket (106) is shown as a threaded cavity and can be seen to terminate at a transducer receiver (114). The transducer receiver includes a transducer seal (118) which surrounds a testing portion (116), which may also be referred to as a sensing aperture. The testing portion (116) is an area within the housing (102) where the transducer receiver (114) and the sample path (120) intersect. When the transducer assembly (122) is installed in the housing (102), the operative portion of the transducer assembly (122) may come into contact with sample fluid within the sample path (120) at the testing portion (116), as will be explained in further detail below.

In the view of FIG. 3, it can be seen that sample fluid provided to the sample input (104) will move horizontally through the housing (102), move vertically into and then out of the testing portion (116), and then move vertically through the housing (102) until it exits the sample output (112).

Figure 4:
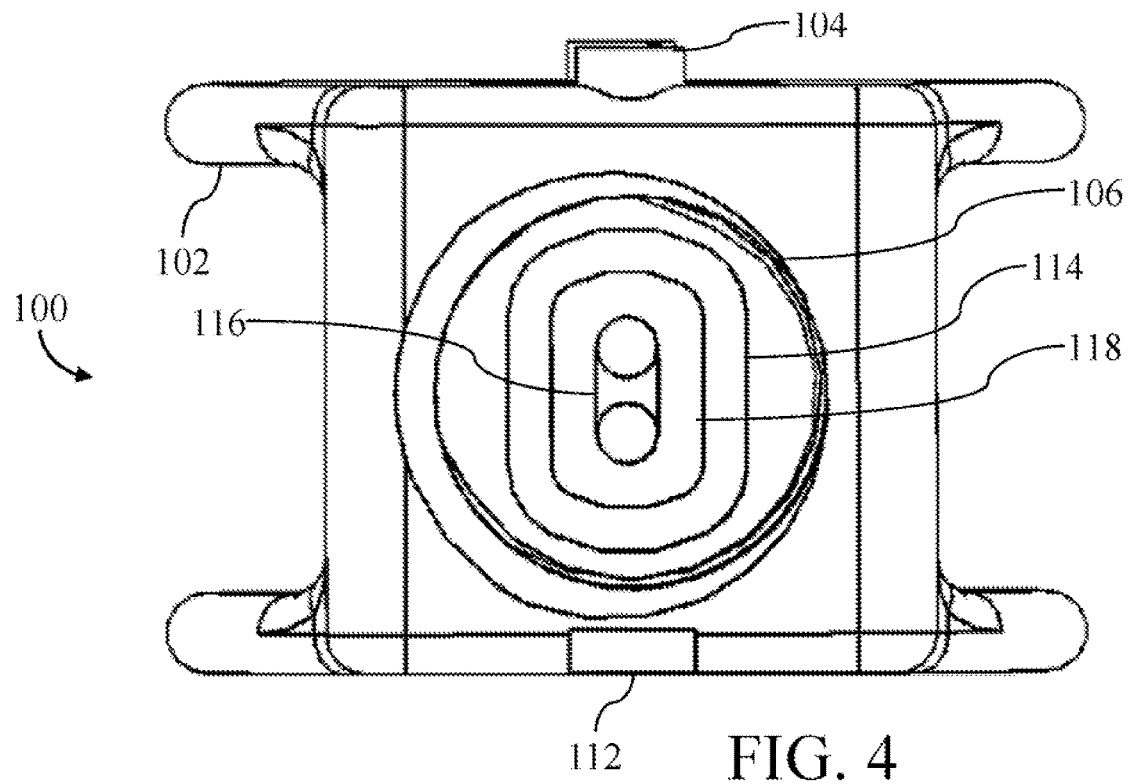
FIG. 4 is a top down view of the ion selective electrode assembly of FIG. 2.
Figure 5:
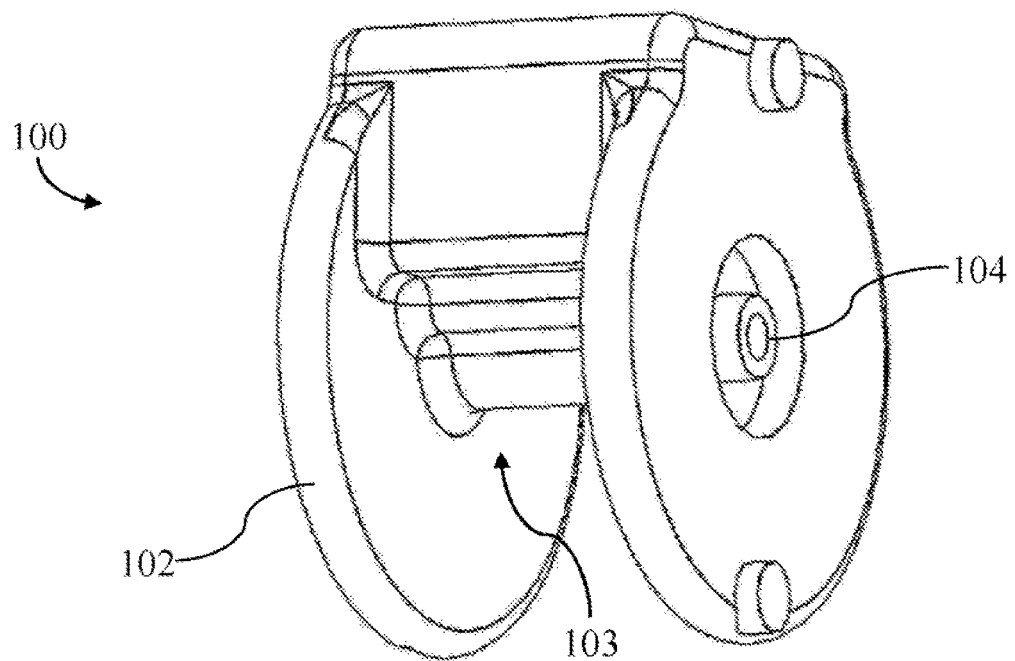
FIG. 5 is an alternate perspective view of the ion selective electrode assembly of FIG. 2.

FIGS. 4 and 5 each show alternate views of the ISE assembly (100). In FIG. 4 the ISE assembly (100) is shown again with the transducer assembly (122) removed, and the area of the transducer receiver (114) can be seen, including the transducer seal (118) and the testing portion (116). FIG. 4 shows additional details of the housing (102), including contoured portions (103) which may be shaped and adapted to aid in positioning of the ISE assembly (100) within the biological testing system (10).

FIGS. 6A and 6B each show perspective views of the transducer assembly (122). The transducer assembly (122) includes a transducer (126), a threaded portion (128), an install nut (130), and a probe (124). The probe (124) terminates at a connector (132) and is conductively coupled to the transducer (126) within the threaded portion (128). When the transducer (126) contacts a fluid sample a voltage is produced and transmitted, via the probe (124) to the connector (132), which itself is adapted to couple with the processor (12) when the ISE assembly (100) is installed within the biological testing system (10). The threaded portion (128) houses a portion of the probe (124) that conductively couples with the transducer (126) and also threads into the transducer receiver (114). The install nut (130) is fixed to the threaded portion (128) and may be gripped with a tool when installing the threaded portion (128) to allow the transducer assembly (122) to be tightly installed in the transducer assembly socket (106).

Figure 7:
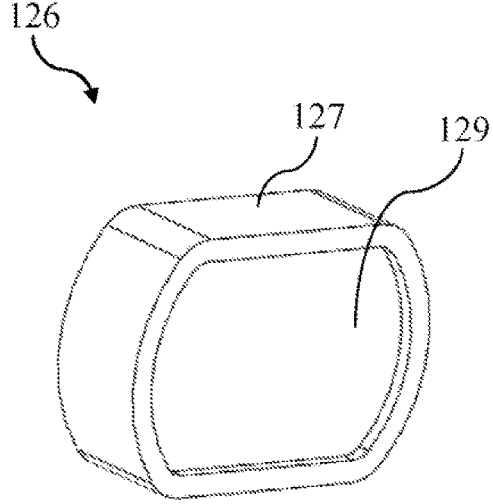
FIG. 7 is a perspective view of an exemplary transducer of the transducer assembly of FIG. 6A.

FIG. 7 shows a perspective view of the transducer (126). The transducer (126) includes a body (127) and a membrane (129). The membrane (129) may be formed of polymer, glass, crystal, or other appropriate membrane materials, and may be cast or otherwise coupled to the body (127). The body (127) may be formed of a conductive material. For example, in some implementations the body (127) may be formed from a solid graphite material with the membrane (129) cast directly onto the surface of the body (127).

The composition and structure of the membrane (129) may be varied in order to produce transducers capable of measuring various substances, as will be apparent to those of ordinary skill in the art in light of this disclosure. For example, the porosity or thickness of the membrane (129) may be varied depending upon whether the particular membrane is going to measure sodium or potassium. In addition to the membrane (129) allowing the measurement of substances, it is also flexible and aids in sealing the sample path (120) when the transducer assembly (122) is installed in the ISE assembly (100).

Figure 8:
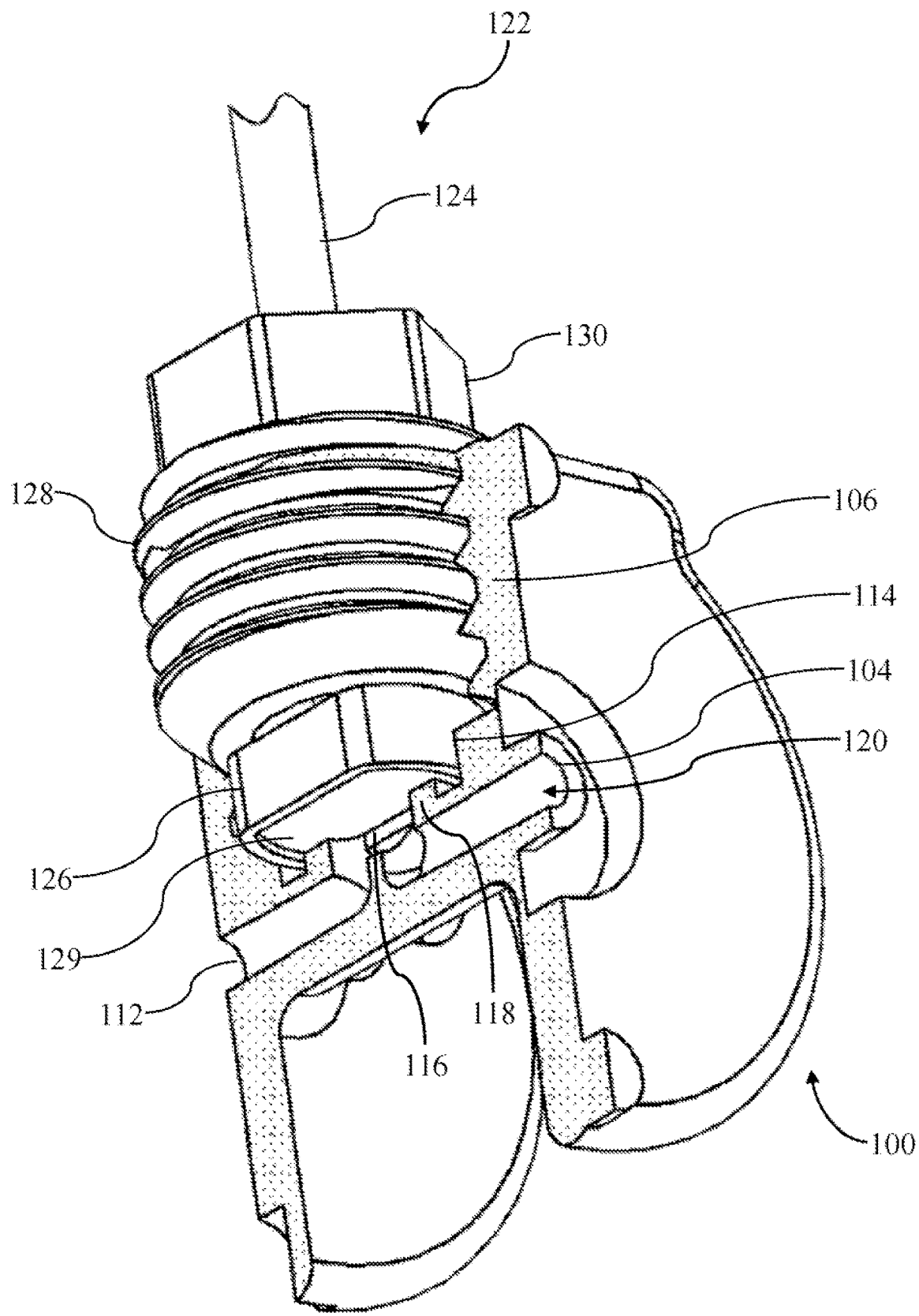
FIG. 8 is a cross sectional view along the line A-A of FIG. 2 of the ion selective electrode assembly including the transducer assembly of FIG. 6.

FIG. 8 is a cross sectional view along the line A-A of FIG. 2 of the ion selective electrode. FIG. 8 illustrates both the fully assembled ISE assembly (100) and the sealing function of the membrane (129). In that figure, the transducer assembly (122) can be seen within the transducer assembly socket (106). While the threaded portion (128) and the transducer assembly socket (128) are shown as a threaded screw-type assembly, it should be understood that the transducer assembly (122) may be fixed within the housing (102) in other ways, such as by friction fit, mechanical latching, and spring release latching, for example.

Below the threaded portion (128), the transducer (126) can be seen seated within the transducer receiver (114) such that the transducer seal (118) is in contact with the membrane (129) of the transducer (126). The ISE assembly (100) may be assembled in the manner shown by, for example, placing the transducer (126) in the transducer receiver (114), and then screwing the threaded portion (128) into the transducer assembly socket (106) by rotating the install nut (130). As the threaded portion (128) is advanced it will contact the backside of the transducer (126) and press it into the transducer seal (118). The membrane (129) will flex as it is pressed against the transducer seal (118) and create a pressure seal against he sample path (120). The threaded portion (128) and install nut (130) may be adapted (e.g., by changing their size or location) to control the depth to which the threaded portion (128) may be advanced in order to allow for suitable pressure to form a seal, while preventing overtightening which may damage the membrane (129). In addition to such structural limitations, other pressure limiting feature may be implemented such as by including a torque-activated slip feature in the install nut (130), providing an inflexible structural contact between the transducer seal (118) and a portion of the transducer (126), or other features as will be apparent to those of ordinary skill in the art in light of this disclosure.

When assembled as shown in FIG. 8, it can be seen that the membrane (129) portion of the transducer (126) is exposed to the testing portion (116) within the sample path (120). As sample fluid flows through the sample path (120) it will contact the membrane (129) allowing for analysis of the sample fluid. This configuration provides a number of advantages. For example, the membrane (129) surface directly integrates with the sample path (120) providing a uniform surface for contacting the sample fluid and preventing carryover or retention of sample fluid between tests. Additionally, the seal between the sample path (120) and the transducer assembly socket (106) is provided by the mechanical force of the threaded portion (128) against the transducer (126), meaning that no adhesives, sealants, or separate sealing features are needed. As a result, there is no risk of contamination from adhesives, and there is no risk of degrading adhesives or sealants eventually failing and reducing shelf life of the ISE assembly (100). The pressure seal provided by the threaded portion (128) is effectively permanent allowing for extended shelf life and may be easily checked or tightened with the install nut (130) prior to or during use.

In some implementations the housing (102) and the transducer assembly socket (106) may be formed of a plastic or polymer, while the threaded portion (128) may be a similar material. Such materials may be selected to aid in achieving a seal between the components, preventing overtightening against the transducer (126), avoiding conductivity from the transducer (126), or in maintaining a seal between the components during a long shelf life in various storage conditions (e.g., as varying temperatures may cause material expansion and reduction for some materials), with such selections being apparent to those of ordinary skill in the art in light of this disclosure.

As an additional advantage, the transducer (126) may be placed directly into the transducer receiver (114) and sealed by placing the threaded portion (128) and tightening the install nut (130). Since the membrane (129) may be cast directly onto the body (127), and since the ISE assembly (100) may be fully assembled without adhesives or other steps, human contact with the membrane (129) may be minimized or entirely avoided. Since contact with the membrane (129) can result in the porous feature being clogged with debris, minimizing such contact and providing a simple assembly of the ISE assembly (100) as illustrated in FIG. 8 may reduce errors and improve the accuracy of test results. As an additional advantage, such implementations provide a solid-state transducer (126) and membrane (129), which may provide benefits in the simplicity, reliability, durability, ease of assembly, and ease of use of the ISE assembly (100). The frequency and extent of maintenance required for the ISE assembly (100) may also be reduced, as there is no need to inspect adhesives or seals or clean or flush carryover contamination from cavities, and there is a reduced need to fully inspect sample paths as compared to ISEs that use a membrane coated sample path.

Varying implementations of the ISE assembly (100) will provide varying contact surface areas between the membrane (129) and the sample path (120). For example, some implementations may have a contact surface area of 0.006 $in^2$, allowing for the overall size of the ISE assembly (100) to be reduced as desired. Accurate measurements with such a contact surface area is possible due to factors such as the solid state design of the transducer (126), the position of the membrane (129) within the sample path (120), the lack of adhesives, solvents, sealants, or other contaminants which may compromise the membrane (129), and other factors. Measurement response time may also be reduced to one second or less, and may be performed with a smaller quantity of sample fluid due in part to the reduced contact surface area and the accuracy at which the membrane (129) can provide results.

As has been discussed, the ISE assembly (100) may be configured to test for the concentration of a particular substance (e.g., sodium, potassium, chloride) by varying the characteristics of the membrane (129). In some implementations, each ISE assembly (100) may test for a single substance, such that the sample path (18) of FIG. 1 may pass through multiple ISE assemblies (100), with each ISE assembly (100) being configured to provide a different measurement. The sample path (18) may pass through the ISE assemblies (100) in sequence or may branch and pass through ISE assemblies (100) in parallel. Other features, variations, and advantages of the ISE assembly (100) exist and will be apparent to those of ordinary skill in the art in light of this disclosure, with some such variations being disclosed and described in further detail below.

II. Exemplary Reference Electrode

Figure 9:
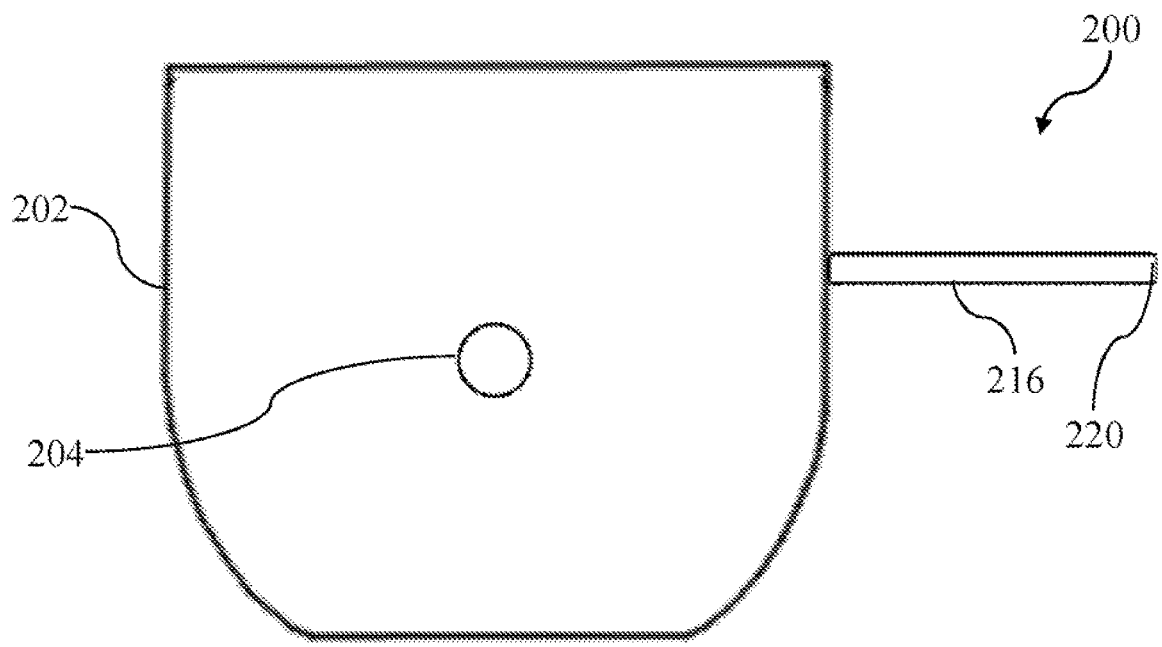
FIG. 9 is a schematic diagram of an exemplary reference electrode.

As has been described, ISEs like the ISE assembly (100) measure concentration of substances in sample fluid based upon a voltage produced during contact. The interpretation of voltage measurements provided by the ISE assembly (100) typically requires a reference voltage. In some implementations, this reference voltage may be provided by a reference electrode. FIG. 9 shows a schematic diagram of an exemplary reference electrode (200) that is implemented and assembled using some of the features of the ISE assembly (100). The reference electrode (200) differs from other ISEs in several ways, including in that it provides a constant voltage measurement during testing and in that the sensing element of the reference electrode (200) does not directly contact the sample path (18).

Figure 10:
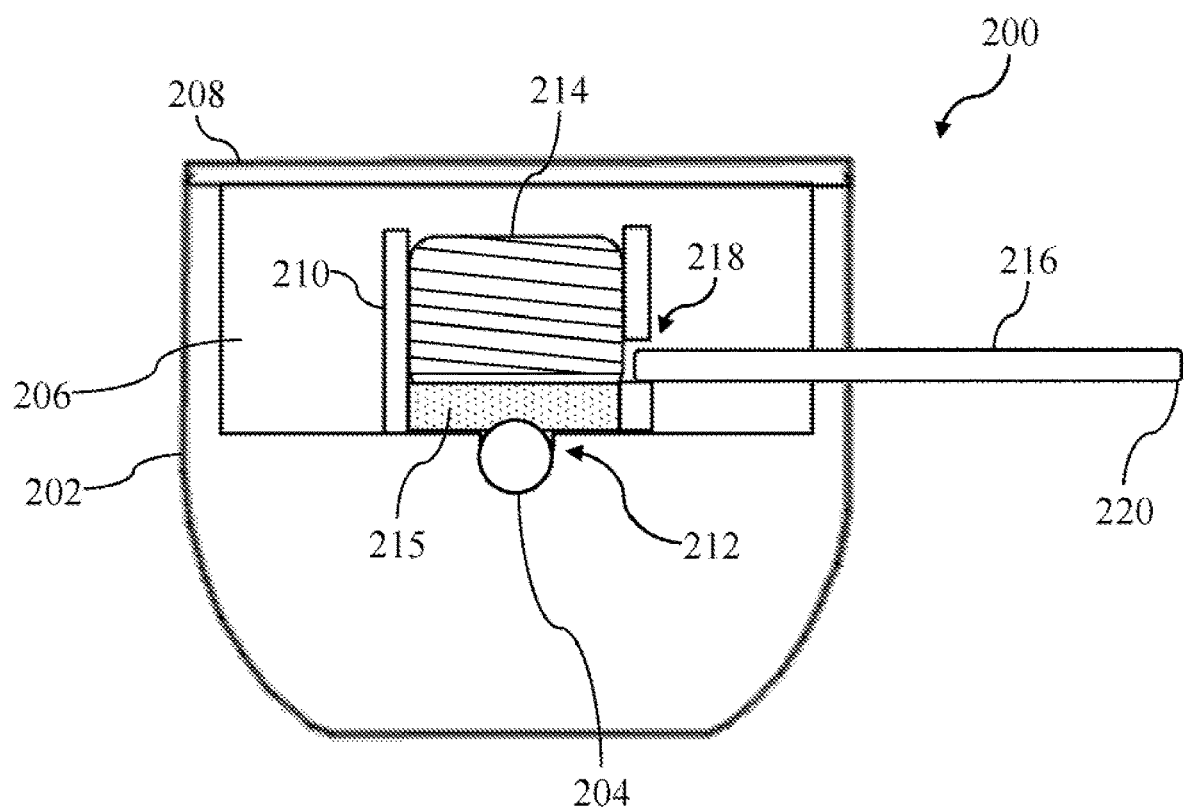
FIG. 10 is a schematic diagram of the reference electrode of FIG. 9 with interior details shown.

As shown in FIG. 9, the reference electrode (200) includes a housing (202) with a sample input (204). A probe (216) partially extends from the housing (202) and includes a connector (220) at a distal end that couples with the processor (12) to provide data or signals indicative of a measured voltage. FIG. 10 is a schematic diagram that illustrates components within the housing (202) of the reference electrode (200). The sample input (204) receives sample fluid when the reference electrode (200) is placed in the sample path (18). Sample fluid travels through a sample path (212) and exits the reference electrode (200) via a sample output (not pictured), as similarly described in the context of the ISE assembly (100). Sample fluid flowing through the sample path (212) will contact a transducer (215). The transducer (215) is sealed against the sample path (212) by a threaded portion (214) that is advanced into a socket (210), as similarly described in the context of the ISE assembly (100).

The housing (202) also includes a reservoir (206) that may be filled with a conductive electrolyte liquid and sealed within the housing (202) by a cap (208). The cap (208) may be pressured sealed onto the housing (202) by screws or other fasteners that attach the cap (208) to the socket (210) or the threaded portion (214). A probe tip (218) at a proximal end of the probe (216) is proximate to but not in contact with the transducer (215). Assembled in this manner, the reference electrode (200) may provide a constant reference voltage to the processor (12) via the connector (220) as the sample fluid contacts the transducer (215). When used in the biological testing system (10), the reference electrode (200) may be paired with one or more ISE assemblies (100) (e.g., in sequence or in parallel, along the sample path (18)) in order to provide a reference voltage usable to determine ionic concentration in the sample fluid.

III Exemplary Parallel Testing Assembly

As has been described, the biological testing system (10) may include several electrode assemblies (e.g., the reference electrode (200), one or more ISE assemblies (100)). In implementations of the biological testing system (10) that may be advantageous for biological testing, dedicated ISE assemblies (100) may be included for measurement of several particular ionic concentration, such as sodium, potassium, and chloride. Some implementations of such a system may include the reference electrode (200) positioned along the sample path (18) in sequence with three ISE assemblies (100), each having a dedicated measurement configuration.

Figure 11:
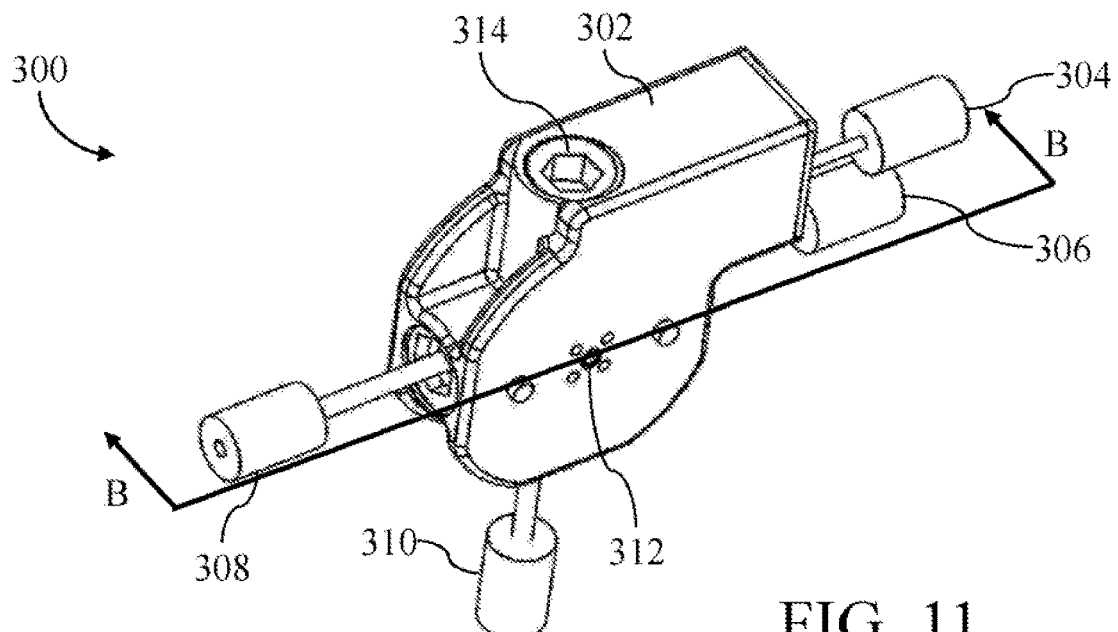
FIG. 11 is a perspective view of an exemplary parallel testing assembly.

In some implementations of the biological testing system (10), the sensing element (20) may be implemented as a single assembly that is placed within the sample path (18), and that includes multiple capabilities. As an example, FIG. 11 shows a perspective view of an exemplary parallel testing assembly (300). The parallel testing assembly (300) receives and tests sample fluid similarly as described in the context of the ISE assembly (100) and the reference electrode (200), in that provided sample fluid flows into the parallel testing assembly (300), flows along a sample path, contacts a sensing element along the sample path, and then exits the parallel testing assembly (300).

However, in using the parallel testing assembly (300) multiple sensing capabilities may be provided and sample fluid measurements may be performed within substantially the same time frame, in parallel, rather than flowing through multiple ISE assemblies (100) in sequence. As a result, overall testing time of a fluid sample may be reduced.

The parallel testing assembly (300) of FIG. 11 includes a housing (302) that includes a sample input (312) that receives and transmits sample fluid onto a sample path that passes through the housing (302). Sample fluid passing through the parallel testing assembly (300) may be tested by a reference electrode (304), a first electrode (306), a second electrode (308), and a third electrode (310) in parallel, rather than in sequence. Thus, in implementations of the biological testing system (10) that test the concentration of three substances within sample fluid (e.g., sodium, potassium, chloride), the parallel testing assembly (300) can be used in place of four separate assemblies, and can also advantageously increase the speed of sample fluid throughput and testing by performing measurements in parallel.

Figure 12:
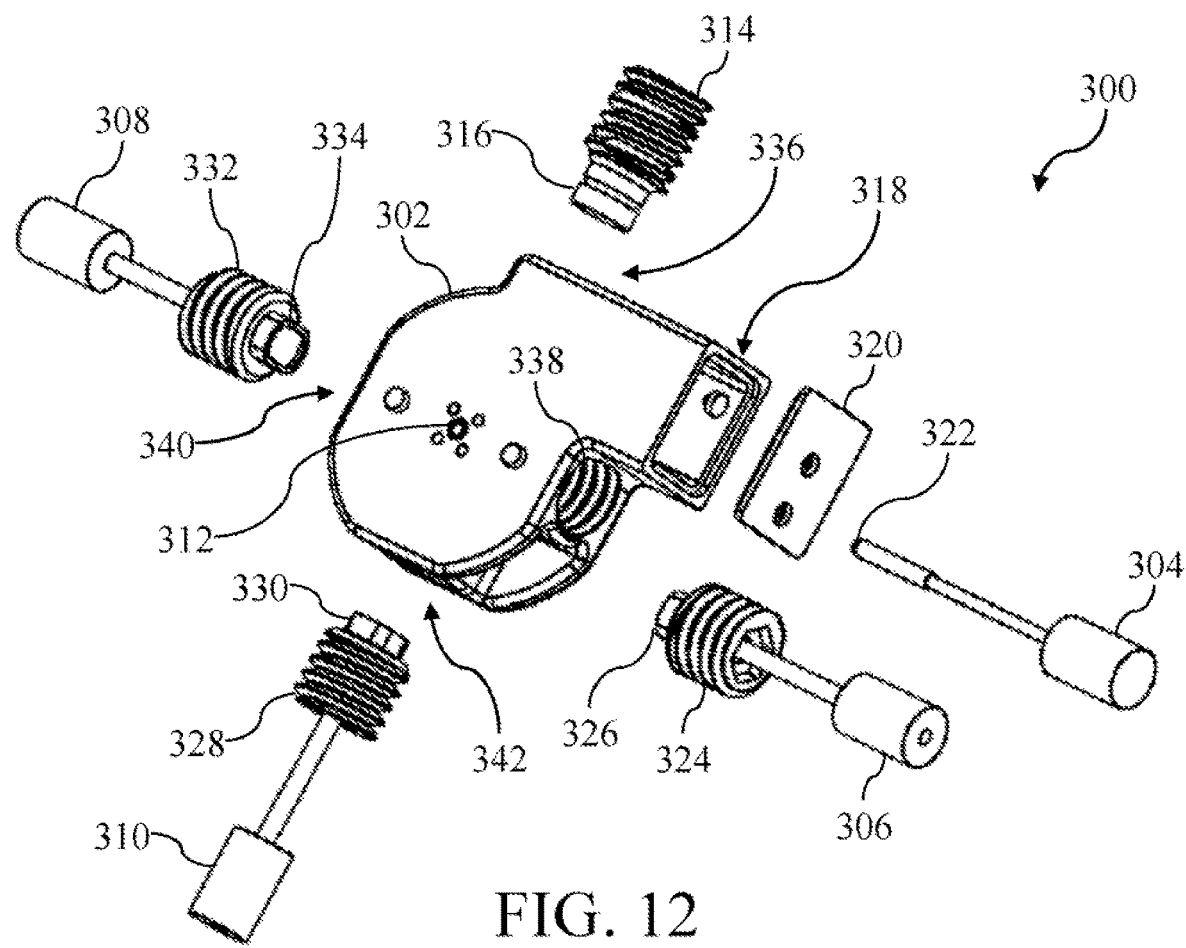
FIG. 12 is an exploded perspective view of the parallel testing assembly of FIG. 11.

While the parallel testing assembly (300) includes several components have similar features and function as those used in the ISE assembly (100), their arrangement differs in order to fit within the single housing (302). To illustrate, FIG. 12 show an exploded perspective view of the parallel testing assembly (300). The reference electrode (304) is shown withdrawn from a cap (320) and from within a reservoir (318) within the housing (302). As described in the context of the reference electrode (200), the reservoir (318) may be filled with a conductive electrolyte fluid to aid in measurement of a reference voltage. Once filled, the reservoir is sealed by the cap (320) and the reference electrode (304) is passed through the cap (320) so that a probe tip (322) rests within the reservoir (318) proximately to but not in contact with a reference transducer (316). The reference transducer (316) is similar to the transducer (215) and is pressured sealed within the housing (302) by being inserted within a reference socket (336) and pressed upon by a threaded portion (314) that is advanced into the reference socket (336).

The first electrode (306) includes a threaded portion (324) and a transducer (326), similar to the transducer (126) and the threaded portion (128) of the ISE assembly (100). The transducer (326) may be placed in a first electrode socket (338) and pressure sealed within the housing (302) by advancing the threaded portion (324) into the first electrode socket (338). As with the transducer assembly (122), voltages produced at the transducer (326) are conductively communicated along the length of the electrode (306) to the processor (12). The second electrode (308) includes a threaded portion (332) and a transducer (334) that may be pressured fitted into a second electrode socket (340), with each component having a similar function and features as the corresponding component of the first electrode (306). The third electrode (310) includes a threaded portion (328) and a transducer (330) that may be pressure fitted into a third electrode socket (342), with each component having a similar function and features as the corresponding component of the first electrode (306).

Arranged as shown, the parallel testing assembly (300) may be configured such that each electrode provides a different measurement of the sample fluid. As an example, the first electrode (304) may be configured (e.g., based upon the characteristics of a membrane of the transducer (326)) to measure sodium content in a sample fluid; the second electrode (308) may be configured to measure potassium content in a sample fluid; and the third electrode (310) may be configured to measure chloride content in a sample fluid. With the reference electrode (304) providing reference voltage measurements for such a configuration, the parallel testing assembly (300) can replace several discrete components that may be arranged sequentially within the biological testing system (10), while sharing the same advantages as the ISE assembly (100) and reference electrode (200) (e.g., pressure sealing against the manifold (129), no requirement for adhesives, sealants, or solvents, increase durability and shelf life, and other improvements described above).

Figure 13:
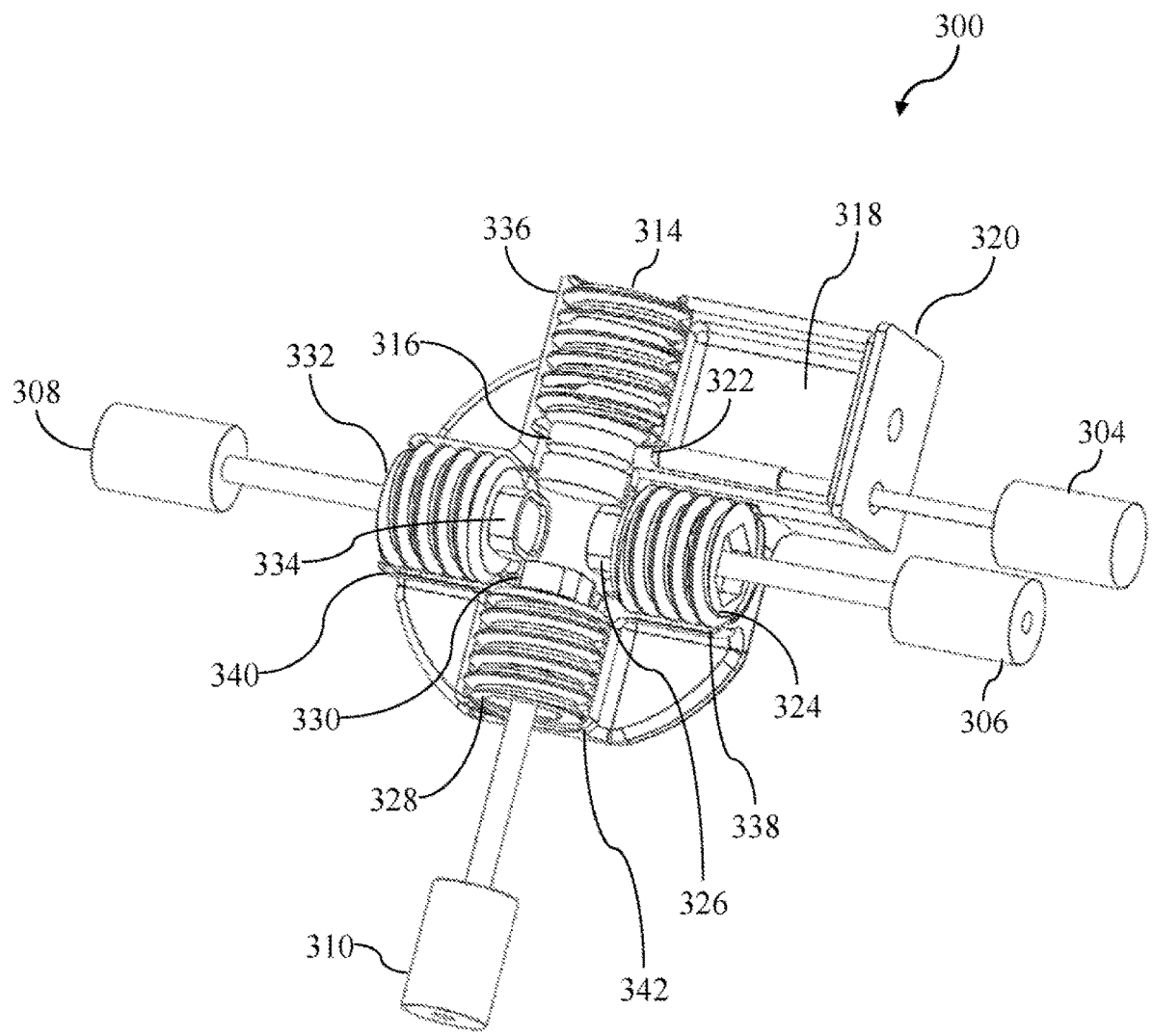
FIG. 13 is a schematic diagram of the parallel testing assembly of FIG. 11 with portions of an exemplary housing omitted to show interior details.

A simulated view of the arrangement of electrodes within the housing in the fully assembled parallel testing assembly (300) can be seen in FIG. 13, which shows a schematic diagram of the parallel testing assembly (300) with several portions omitted for visibility. In that figure, the threaded portion (324) of the first electrode (306) can be seen advanced into the first electrode socket (338), the threaded portion (332) of the second electrode (308) can be seen advanced into the second electrode socket (340), and the threaded portion (328) of the third electrode (310) can be seen advanced into the third electrode socket (342). Similarly, the threaded portion (314) of the reference electrode (304) can be seen advanced into the reference socket (336). With this arrangement, the reference transducer (316), as well as the transducer (326) of the first electrode (306), the transducer (334) of the second electrode (308), and the transducer (330) of the third electrode (310) are all positioned and sealed within the housing (302) proximate to the position of the sample input (312) of the parallel testing assembly (300). Also visible in FIG. 13 is the reservoir (318) and the position of the probe tip (322) relative to the reference transducer (316) within the reservoir (318).

Figure 14:
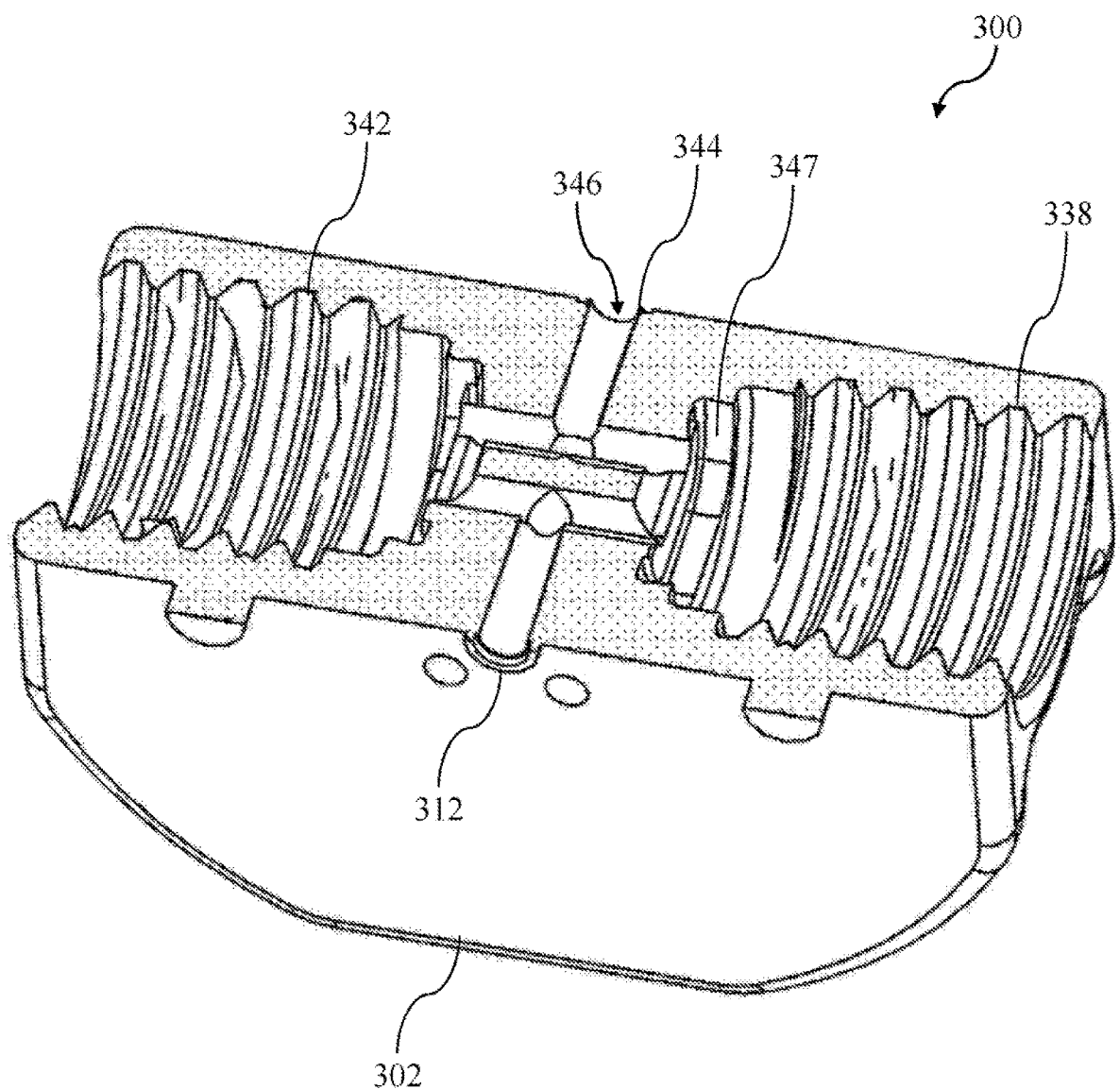
FIG. 14 is a cross sectional view along the line B-B of FIG. 11 of the parallel testing assembly with electrode assemblies removed.

One structed that is not visible in FIG. 13 is the structure of channels that diverts sample fluid to each of the transducers so that the fluid may be tested without any crosstalk (e.g., erroneous detection of voltage or other characteristics) between transducers. That structure is partially shown in FIG. 14, which is a cross sectional view along the line B-B of FIG. 11 of the parallel testing assembly (300), with the first electrode (306), second electrode (308), and third electrode (310) removed from the housing (302). In that figure, the internal structure of the housing (302) is visible and it can be seen that the sample input (312) leads to a set of channels that passes through the housing (302) and exits via a sample output (344) defining a sample path (346). The sample path (346) is defined within the housing (302) such that a flow of sample fluid will split and flow to a transducer receiver (347) of each threaded portion within the housing (302) in order to contact a transducer positioned within the respective transducer receiver (347), as similarly disclosed in the context of the transducer receiver (114) of the ISE assembly (100). After passing through each transducer receiver (347), the divergent flows of sample fluid recombine and exist the housing (302) via the sample output (344).

Figure 15:
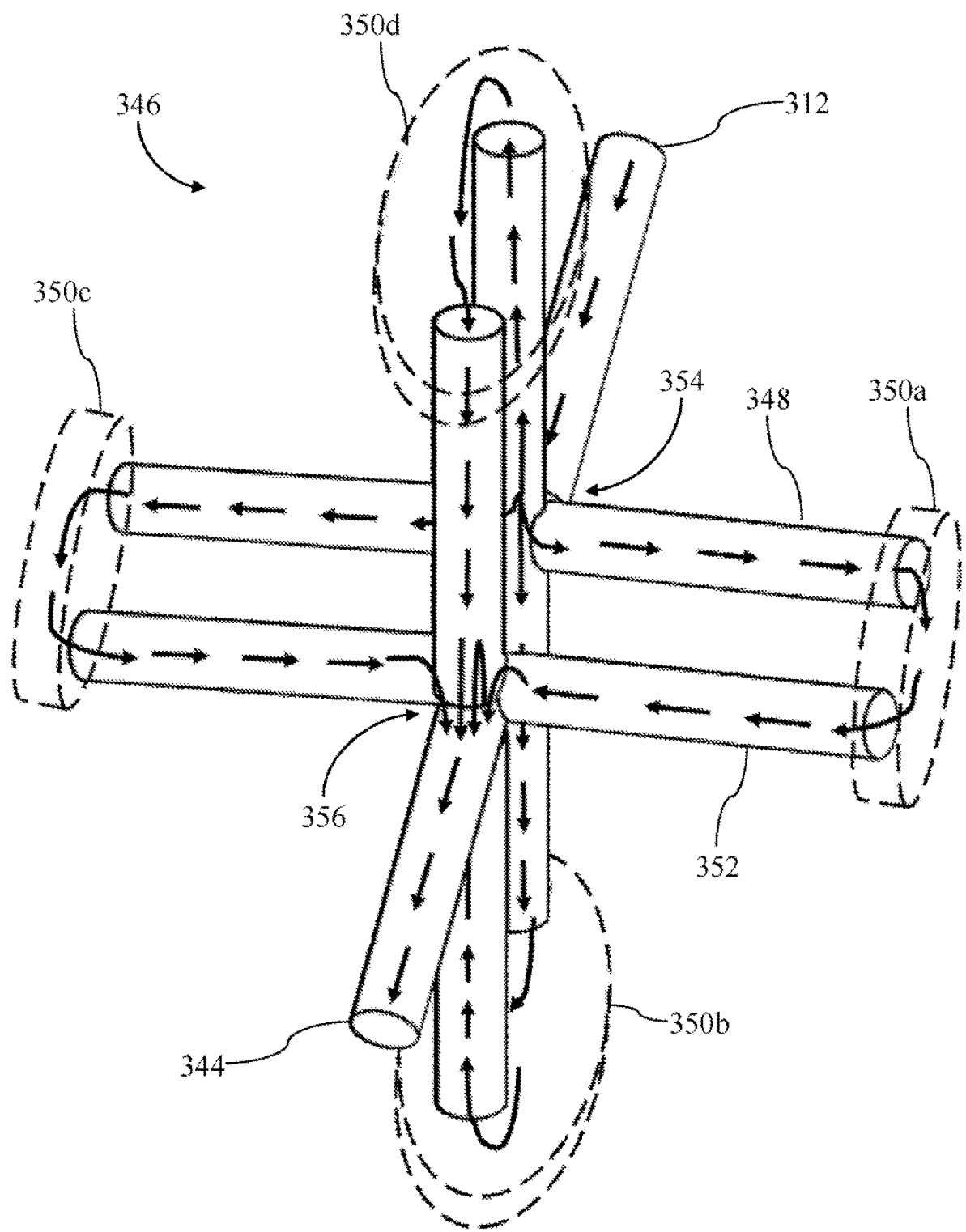
FIG. 15 is a flow diagram showing the flow of liquid through a sample path of the parallel testing assembly.

To additionally illustrate the sample path (346) defined by the structure of the housing (302), FIG. 15 shows a flow diagram that illustrates the flow of liquid through the parallel testing assembly (300). The flow of liquid begins at the sample input (312) and travels in the direction indicated by the arrows. Upon reaching a sample splitter (354) the flow of liquid splits into four separate channels, each a partial sample input (348), and is received by a respective testing portion, as similarly described in the context of the testing portion (116) of the ISE assembly (100).

Relative to the image shown in FIG. 15, it can be seen that a portion of the fluid travels to the right along the partial sample input (348) into a testing portion (350a), and then flows through the testing portion (350a) into a partial sample output (352). Fluid from the partial sample output (352) is then received at a sample merger (356) where the divergent sample flows recombine and then exit via the sample output (344). Similarly, a portion of the fluid travels upwards from the sample splitter (354) into a testing portion (350d), and then flows through the testing portion (350d) downwards towards the sample merger (356) where it recombines with other sample fluid and exits via the sample output (344). As will be apparent, a portion of the fluid also travels to the left from the sample splitter (354) into a testing portion (350c), and then flows through the testing portion (350c) towards the sample merger (356) where it recombines with other sample fluid. Finally, a portion of the fluid also travels downwards from the sample splitter (354) into a testing portion (350b), and then flows through the testing portion (350b) and back towards the sample merger (356) where it recombines with other sample fluid. Splitting and merging of the sample fluid may be accomplished with shaping and contouring of the structures that define the sample path (346), by pressurization of sample fluid inputs, or both, as will be apparent to those of ordinary skill in the art in light of this disclosure.

As may be apparent, each of the testing portions shown in FIG. 15 correspond to a transducer receiver such as the transducer receiver (347), and an electrode seated therein. For example, the testing portion (350c) corresponds to the first electrode (306) and contacts the transducer (326), the testing portion (350a) corresponds to the second electrode (308) and contacts the transducer (334), the testing portion (350b) corresponds to the third electrode (310) and contacts the transducer (330), and the testing portion (350d) corresponds to the reference electrode (304) and contacts the reference transducer (316). In this manner, it can be seen that each transducer may contact the sample fluid flowing through the sample channel (346) while also being isolated from each other such that electrical crosstalk is prevented.

The parallel testing assembly (300) may be advantageously implemented for the reasons given in the context of the ISE assembly (100) and the reference electrode (200), as well as for the additional advantages of parallel testing and, in effect, increased fluid sample throughput. For example, where the biological testing system (10) includes the parallel testing assembly (300), the overall length of the sample path (18) may be reduced. To explain with reference to FIG. 15, the longest distance that any portion of the sample fluid may travel through the sample path (346) is about one quarter of the longest distance that sample fluid might travel through four sequentially arranged assemblies, since the sample fluid is split and travels along each branch in parallel. By reducing the overall length of the sample path (18), the biological testing system (10) can test a sample, perform any intra-test maintenance, and then test a second sample more quickly. The parallel testing assembly (300) also provides additional advantages in terms of usability and maintenance, as a single assembly may be easier to install and replace than multiple assemblies. Other features, advantages, and variations of the parallel testing assembly (300) exist and will be apparent to those skilled in the art in light of this disclosure.

IV. Exemplary Cartridge Assembly

As has been discussed, the biological testing system (10) provides a sample path (18) through which sample fluid flows and contacts one or more sensing elements (20). While such a system may be advantageously used with assemblies such as the ISE assembly (100), the reference electrode (200), and the parallel assembly (300), other types of biological testing systems may be implemented based on this disclosure. As an example, some implementations of a biological testing system and ISE assembly may not require a flow path and may provide several advantages.

Figure 16:
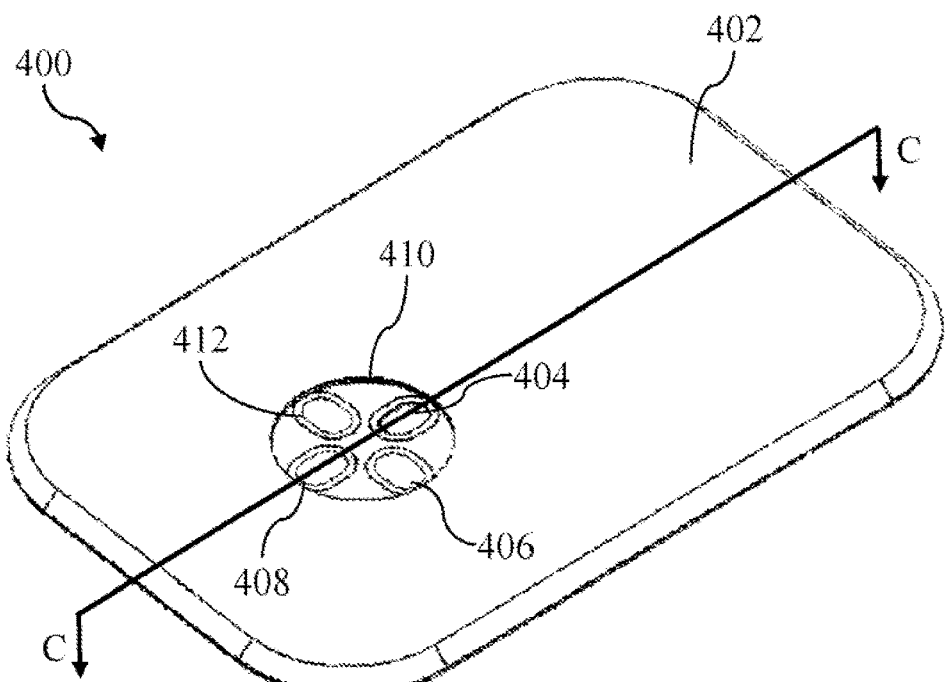
FIG. 16 is a perspective view of an exemplary cartridge assembly.
Figure 19:
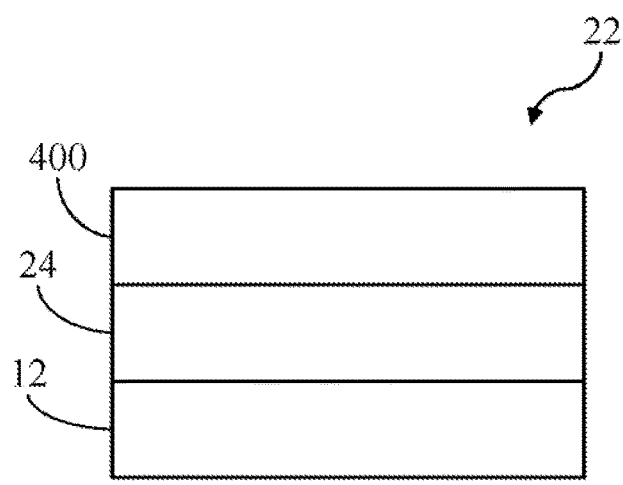
FIG. 19 is a schematic diagram of an alternate exemplary biological testing system usable with the cartridge assembly of FIG. 16.

As an example, FIG. 16 is a perspective view of an exemplary cartridge assembly (400). The cartridge assembly (400) includes a body (402) that is flat and includes a beveled edge and rounded corners. Depending upon a particular implementation, the body (402) may be between about 0.5 cm and about 2 cm in length, between about 0.35 cm and about 1.5 cm in width, and between about 0.1 cm and about 0.4 cm in depth. The body (402) is sized and shaped to be usable as a portable cartridge type assembly that may be inserted into and removed from a biological testing system (22) such as that shown in FIG. 19. The biological testing system (22) includes the processor (12), and also includes a cartridge receiver (24). The cartridge receiver (24) is configured to receive and conductively couple with the cartridge assembly (400), provide any necessary electrical outputs during testing of sample fluid provided to the cartridge assembly (400), receive testing outputs (e.g., data, electrical signals, or other information indicative of voltage), and provide testing outputs to the processor (12) for processing and interpretation as described in the context of FIG. 1. The size and shape of the cartridge assembly (400) may be varied based upon the characteristics of the cartridge receiver (24), based upon factors of usability (e.g., a particularly small size may be difficult to handle and place in the cartridge receiver (400)), and based upon other factors, as will be apparent to one of ordinary skill in the art in light of this disclosure.

The cartridge (400) includes a sample well (410) as a shallow depression that descends into the body (402). The sample well (410) includes a reference transducer (404), a first transducer (406), a second transducer (408), and a third transducer (412). Each transducer of the sample well (410) functions similarly to the transducer (126) of the ISE assembly (100), in that they generate an electrical voltage in response to contacting the sample fluid, with he electrical voltage being a reference voltage or a voltage indicative of a concentration of a substance in the sample fluid, depending upon the type and characteristics of the transducer (e.g., variations in the characteristics of a membrane of the transducer, as described in the context of the membrane (129)).

When using the cartridge assembly (400), a liquid may be placed directly in the sample well (410) and retained there (e.g., either by the effect of surface tension, the application of a cover or seal over the sample well (410), or both). When the cartridge assembly (400) is not connected to the biological testing system (22), no analysis of the sample is performed. However, when the cartridge assembly (400) is coupled to the cartridge receiver (24) the transducers are operative and will sense and transmit information related to the resulting voltage to the processor (12), as has been described.

Figure 17:
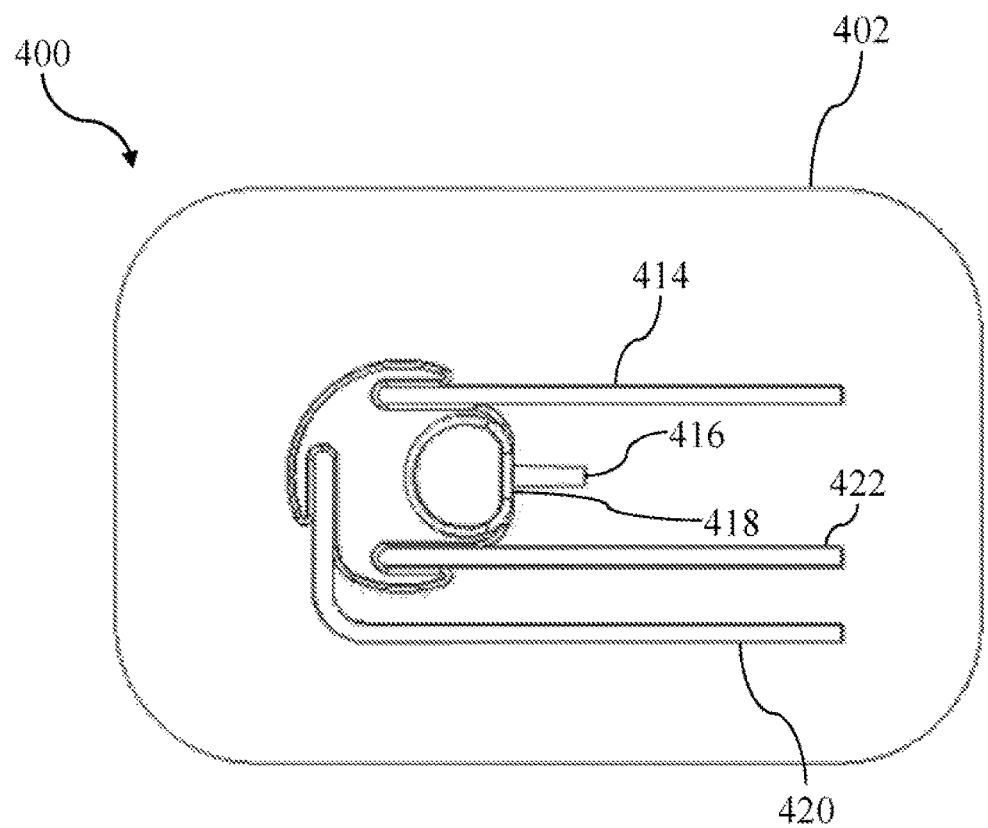
FIG. 17 is a bottom view of the cartridge assembly of FIG. 16.

Transmission of voltage information to the processor is accomplished by a set of connectors on an underside of the body (402), as can be seen in FIG. 17. In that figure, it can be seen that a first connector (414), a second connector (420), and a third connector (422) extend from an underside of the body (402) beneath the sample well (410). Each of the connectors is conductively coupled to a corresponding transducer and positioned to conductively couple with the cartridge receiver (24) and processor (12) when inserted. A reservoir (418) can also be seen with a reference connector (416) extending therefrom, in an arrangement similar to the reservoir (206) and the probe (216) (e.g., the reference connector (416) extends into the reservoir (418), which may be filled with a conductive fluid, and a proximal tip is positioned to be proximate to but not in contact with the reference transducer (404)). With such an arrangement, each transducer is embedded within the body (402) and is coupled to the corresponding connector on the underside of the transducer.

Figure 18:
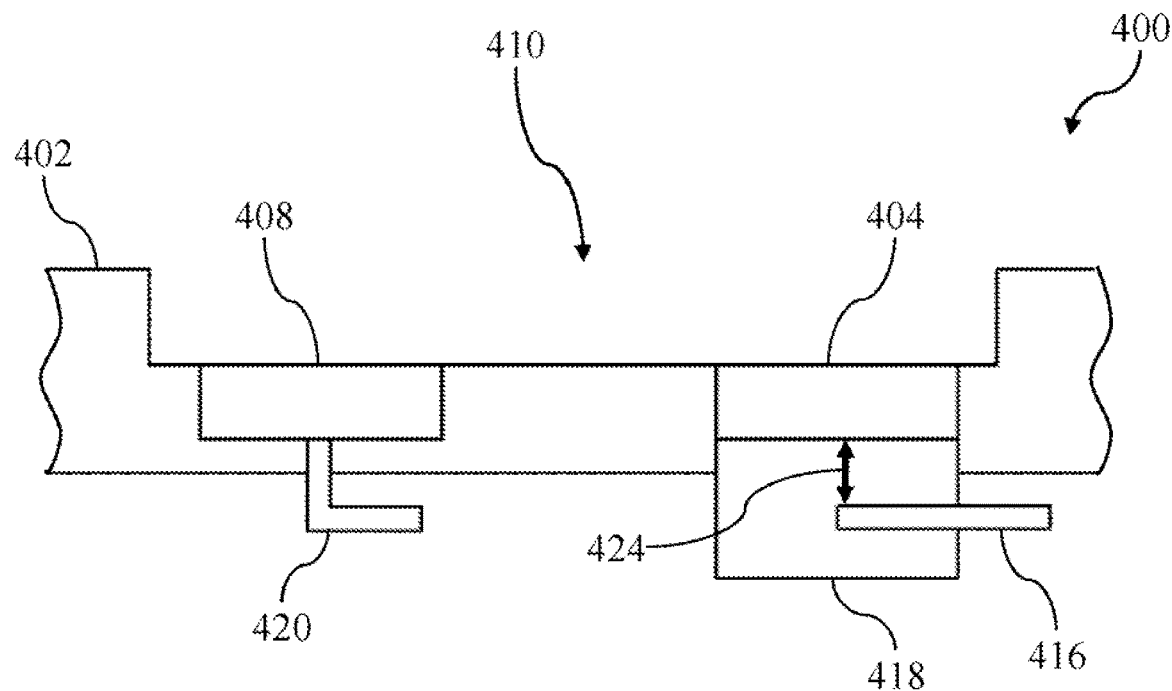
FIG. 18 is a schematic diagram of a cross sectional view along the line C-C of FIG. 16 of the cartridge assembly.

FIG. 18 is a schematic diagram showing an example of such an arrangement. In that figure, which simulates a cross sectional view along line C-C of FIG. 18, the sample well (410) can be seen extending into the body (402). The second transducer (408) is visible embedded within the body (402) and the second connector (420) can be seen in contact with an underside of the second transducer (408) and extending outward from the body (402) to couple with the cartridge receiver (24) when the cartridge assembly (400) is inserted. The reference transducer (404) can also be seen embedded within the body (402). The underside of the reference transducer (404) is opened to the reservoir (418) and will contact a fluid placed therein. The reference connector (416) extends through a wall of the reservoir (418) and its proximal end is positioned proximately to the underside of the reference transducer (404) but separated by a distance (424).

The cartridge assembly (400) shares some similarities with the parallel testing assembly (300) in that the sample well (410) contains four transducer, which may support a configuration including a reference measuring transducer, a sodium concentration transducer, a potassium concentration transducer, and a chloride concentration transducer. However, the cartridge assembly (400) lacks a sample path or fluid flow through the assembly, and instead receives a fluid in the sample well (410). Implementations lacking a sample path may be advantageous by reducing the need for pressurizing or moving sample fluid, reducing the need for cleaning and flushing channels of the sample path, and preventing carryover between samples (e.g., when the cartridge assembly (400) is disposed or cleaned after use).

Advantages of the cartridge assembly (400) include that it is suitable for use at a point of care and may also be disposed of or cleaned and reused after. As an example, a physician providing care directly to a patient may prepare the cartridge assembly (400) by removing it from its packaging and removing a sticker or seal to expose the sample well (410). A patient biological sample may be collected and dropped directly into the sample well (410) (e.g., such as a droplet of blood), or may be collected and separately prepared (e.g., by adding or mixing with reagents, solvents, and other substances) and dropped directly into the sample well (410). The cartridge assembly (400) may then be prepared for transport by sealing the sample well (410) to prevent the sample from spilling out or being contaminated during transport. The cartridge assembly (400) may then be transported to the location of the biological testing system (22), which may be in the same building or facility as the physician or may be remotely located to provide service to a number of care providers. The cartridge assembly (400) may be inserted into the cartridge receiver (24) and the results may be captured by the processor (12) and saved, displayed, or transmitted to a recipient (e.g., such as by providing the testing results via a website, web interface, electronic message, or other communication). Once testing is complete, the cartridge receiver (24) may automatically dispose of the cartridge assembly (400), or it may be manually removed and disposed of in order to ready the cartridge receiver (24) for a subsequent cartridge.

The biological testing system (22) may be advantageously used in such a scenario as it can quickly test samples as the cartridge assembly (400) is received, while also having a lower maintenance requirement and lower potential for carryover since it lacks a shared sample path or fluid transport system.

V. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An ion selective electrode comprising: (a) a housing comprising: (i) a sample path passing through the housing, the sample path comprising a sensing aperture, (ii) an electrode socket defined by an opening in the housing, the electrode socket comprising a cavity within the housing accessible from the opening, and (iii) a transducer receiver positioned within the cavity and connected to the sample path via the sensing aperture; (b) a sensor comprising a membrane structure and a membrane, wherein: (i) the membrane structure is configured to position the membrane at the sensing aperture when the sensor is placed in the transducer receiver, so that a liquid solution passing though the sample path contacts the membrane, and (ii) the membrane is configured to produce an electrical potential based upon contact with the liquid solution; (c) a socket plug adapted to fit the electrode socket and bias the membrane against the sensing aperture; and (d) an electrical contact passing through the socket plug and coupled with the sensor, wherein the electrical contact is usable to measure the electrical potential from outside the housing.

Example 2

The ion selective electrode of example 1, wherein the electrical contact comprises an internal contact and an external contact, and wherein: (i) the socket plug is configured to place the internal contact against the membrane structure when coupled with the electrode socket, (ii) the external contact extends from the electrical contact, outside of the housing, and (ii) the internal contact is coupled with the external contact and configured to transfer the electrical potential from the membrane structure to the external contact.

Example 3

The ion selective electrode of any one or more of examples 1 through 2, wherein the socket plug comprises a threading configured to couple the socket plug with the electrode socket and bias the membrane against the sensing aperture as the socket plug is advanced into the electrode socket.

Example 4

The ion selective electrode of example 3, wherein the socket plug is configured to, when threaded into the electrode socket, make contact with the membrane structure and cause the membrane to compress against the sensing aperture and form a fluid impermeable seal between the membrane and the sensing aperture.

Example 5

The ion selective electrode of example 4, wherein the socket plug is configured to, when threaded into the electrode socket, form a fluid impermeable seal between the socket plug and the electrode socket.

Example 6

The ion selective electrode of any one or more of examples 1 through 5, wherein the membrane structure comprises a conductive graphite.

Example 7

The ion selective electrode of example 6, wherein the membrane comprises a solid-state ion selective membrane.

Example 8

The ion selective electrode of example 7, wherein the solid-state ion selective membrane is cast directly onto the conductive graphite.

Example 9

The ion selective electrode of any one or more of examples 1 through 8, wherein a contact surface area defined by the portion of the membrane exposed to the sample path is about 0.006 inches squared.

Example 10

The ion selective electrode of any one or more of examples 1 through 9, wherein the sensor is self-sealing against the sensing aperture when the electrical contact is coupled with the electrode socket.

Example 11

The ion selective electrode of example 11, wherein the sensor and the sensing aperture do not comprise any other sealing features or adhesives.

Example 12

The ion selective electrode of any one or more of examples 1 through 11, wherein the sensor consists essentially of the membrane structure and the membrane.

Example 13

The ion selective electrode of any one or more of examples 1 through 12, wherein the membrane is configured to produce the electrical potential based upon an ionic concentration of an ion in the liquid solution, and wherein the ion is selected from the group consisting of potassium, sodium, and chloride.

Example 14

A method of assembling an ion selective electrode comprising: (a) producing a housing having dimensions selected to fit a desired application, wherein the housing comprises: (i) a sample path passing through the housing, the sample path comprising a sensing aperture, (ii) an electrode socket defined by an opening in the housing, the electrode socket comprising a cavity within the housing accessible from the opening, and (iii) a transducer receiver positioned within the cavity and connected to the sample path via the sensing aperture; (b) producing a sensor by creating a membrane structure having dimensions selected to fit within the transducer receiver, and casting a membrane directly onto the membrane structure, wherein: (i) the membrane structure is configured to position the membrane at the sensing aperture when the sensor is coupled with the transducer receiver, so that a liquid solution passing though the sample path contacts the membrane, and (ii) the membrane is configured to produce an electrical potential based upon contact with the liquid solution; (c) placing the sensor in the transducer receiver; (d) advancing a socket plug into the electrode socket to bias the membrane against the sensing aperture; (e) coupling an electrical contact with the sensor, wherein the electrical contact is usable to measure the electrical potential from outside the housing.

Example 15

The method of example 14, further comprising configuring the membrane to produce the electrical potential based upon an ionic concentration of an ion in the liquid solution, wherein the ion is selected from the group consisting of potassium, sodium, and chloride.

Example 16

The method of any one or more of examples 14 through 15, wherein the membrane structure comprises conductive graphite, and wherein the membrane comprises a solid-state ion selective membrane, further comprising, after producing the sensor, preventing any direct physical contact with the membrane until the sensor is placed within the transducer receiver.

Example 17

The method of any one or more of examples 14 through 15, further comprising, as a result of coupling the electrical contact with the electrode socket by threading the socket plug into the electrode socket: (a) forming a fluid impermeable seal between the socket plug and the electrode socket; and (b) forming a fluid impermeable seal between the membrane and the sensing aperture.

Example 18

The method of example 17, further comprising producing the sensor and forming the fluid impermeable seal between the membrane and the sensing aperture without including any adhesives, and without including any other sealing features in the sensor and the sensing aperture.

Example 19

A reference electrode comprising: (a) a housing comprising: (i) a sample path passing through the housing, the sample path comprising a sensing aperture, (ii) a reservoir within the housing and a cap adapted to seal the reservoir, (iii) an electrode socket within the reservoir, and (iv) a transducer receiver positioned within the electrode socket and connected to the sample path via the sensing aperture; (b) a sensor comprising a membrane structure and a membrane, wherein: (i) the membrane structure is configured to position the membrane at the sensing aperture when the sensor is placed in the transducer receiver, so that a liquid solution passing though the sample path contacts the membrane, and (ii) the membrane is configured to produce an electrical potential based upon contact with the liquid solution; (c) a socket plug adapted to fit the electrode socket and bias the membrane against the sensing aperture; and (d) an electrical contact passing through the housing, into the reservoir, and through the electrode socket such that a proximal tip of the electrical contact is proximate to the sensor socket plug, wherein the electrical contact is configured to transmit an electrical potential from a fluid at the proximal tip to a distal tip outside the housing.

Example 20

The reference electrode of example 19, wherein the socket plug comprises a threading configured to couple the socket plug with the electrode socket and bias the membrane against the sensing aperture as the socket plug is advanced into the electrode socket.

Example 21

The reference electrode of example 20, wherein the socket plug is configured to, when threaded into the electrode socket, make contact with the membrane structure and cause the membrane to compress against the sensing aperture and form a fluid impermeable seal between the membrane and the sensing aperture.

Example 22

A parallel testing assembly comprising: (a) a housing comprising: (i) a sample path passing through the housing, the sample path comprising a fluid splitter on an intake side and a fluid merger on an output side, wherein the fluid splitter is adapted to split fluid into two or more paths and the fluid merger is adapted to combine fluid from the two or more paths into a single path, (ii) two or more electrode sockets defined by openings in the housing, wherein each electrode socket comprises a cavity within the housing accessible from the opening connected to a path of the two or more paths, and (iii) a reservoir within the housing that opens to a reference electrode socket of the two or more electrode sockets; (b) a reference electrode positioned within the reference electrode socket and sealing a reference membrane of a reference transducer against a reference path of the two or more paths; (c) a reference probe with a proximal end positioned within the reservoir proximate to the reference electrode and a distal end positioned outside the housing; and (d) one or more ion selective electrodes positioned within the two or more electrode sockets, each of the ion selective electrodes sealing a transducer against a path of the two or more paths.

Example 23

The parallel testing assembly of example 22, wherein the sample path is adapted to: (i) receive a sample fluid at the intake side, (ii) divert portions of the sample fluid to each of the two or more paths at the sample splitter, (iii) place portions of the sample fluid in contact with the reference transducer and the transducers of each of the one or more ion selective electrodes, and (iv) receive the portions of the sample fluid at the sample merger and transport the sample fluid out of the housing at the output side.

Example 24

The parallel testing assembly of any one or more of examples 22 through 23, wherein: (i) the reference transducer is configured to produce a reference electrical potential, (ii) a first transducer of the one or more ion selective electrodes is configured to produce an electrical potential indicative of sodium concentration, (iii) a second transducer of the one or more ion selective electrodes is configured to produce an electrical potential indicative of potassium concentration, and (iv) a third transducer of the one or more ion selective electrodes is configured to produce an electrical potential indicative of chloride concentration.

Example 25

The parallel testing assembly of any one or more of examples 22 through 24, wherein: (i) the reference electrode is threaded into the reference electrode socket to seal the reference membrane against the reference path, (ii) each of the one or more ion selective electrodes is threaded into a respective electrode socket of the two or more electrode sockets to seal a respective membrane against a respective path of the two or more paths.

Example 26

A cartridge assembly comprising: (a) a housing adapted to fit within a cartridge receiver of a biological testing system; (b) a sample well defined by a depression within a top surface of the housing; (c) a reference transducer positioned within the sample well and embedded in the housing, wherein the reference transducer is configured to generate a reference electrical potential based upon contact with a sample fluid in the sample well; (d) a reservoir of reference fluid within the housing and in contact with the reference transducer, wherein the reference electrical potential is generated within the reservoir; (e) one or more transducers positioned within the sample well and embedded in the housing, wherein each of the one or more transducers is configured to generate an electrical potential based upon contact with the sample fluid in the sample well; (f) a set of connectors on a bottom surface of the housing, wherein: (i) a reference connector of the set of connectors passes from outside of the housing into the reservoir such that a proximal end of the reference connector is proximate to the reference transducer and a distal end of the reference connector is positioned outside the housing, (ii) a proximal end of one or more connectors of the set of connectors are coupled to the one or more transducers within the housing and a distal end of the one or more connectors is positioned outside the housing, wherein the set of connectors is configured to transmit the reference electrical potential and the electrical potential of the one or more transducers to a processor of the biological testing system when the cartridge assembly is placed in the cartridge receiver.

Example 27

The cartridge assembly of example 26, wherein the one or more transducers comprise: (i) a first transducer configured to generate an electrical potential indicative of sodium concentration in the sample fluid, (ii) a first transducer configured to generate an electrical potential indicative of potassium concentration in the sample fluid, and (iii) a first transducer configured to generate an electrical potential indicative of chloride concentration in the sample fluid.

Example 28

The cartridge assembly of any one or more of examples 26 through 27, wherein the sample well is adapted to retain the sample fluid due to the effect of surface tension.

Example 29

The cartridge assembly of any one or more of examples 26 through 28, further comprising a cover adapted to seal the sample fluid within the sample well when placed on the cartridge assembly.

Example 30

The cartridge assembly of any one or more of examples 26 through 29, wherein the housing is between about 0.5 cm and about 2 cm in length, between about 0.35 cm and about 1.5 cm in width, and between about 0.1 cm and about 0.4 cm in depth VI. Miscellaneous It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A cartridge assembly comprising:
   (a) a housing adapted to fit within a cartridge receiver of a biological testing system;
   (b) a sample well defined by a depression within a top surface of the housing;
   (c) a reservoir, wherein the reservoir is disposed within the housing and beneath the sample well, wherein the reservoir includes an amount of reference fluid therein, wherein the reference fluid is sealed within the reservoir and separated from the sample well;
   (d) a reference transducer disposed within the sample well and in contact with the reservoir, wherein the reference transducer is configured to generate a reference electrical potential based upon contact with the reference fluid in the reservoir;
   (e) a measurement transducer positioned within the sample well and embedded in the housing, wherein the measurement transducer is configured to generate a measurement electrical potential based upon contact with a sample fluid in the sample well; and
   (f) a set of connectors on a bottom surface of the housing, wherein:
      (i) a reference connector of the set of connectors passes from outside of the housing into the reservoir such that a proximal end of the reference connector is proximate to the reference transducer and a distal end of the reference connector is positioned outside the housing,
      (ii) a proximal end of a measurement connector is coupled to the measurement transducer within the housing and a distal end of the measurement connector is positioned outside the housing,
   wherein the set of connectors is configured to transmit the reference electrical potential and the measurement electrical potential to a processor of the biological testing system at the same time in parallel when the cartridge assembly is placed in the cartridge receiver.

2. The cartridge assembly of claim 1, wherein the measurement transducer is configured to generate one of:
   (a) a measurement electrical potential indicative of sodium concentration in the sample fluid;
   (b) a measurement electrical potential indicative of potassium concentration in the sample fluid; and
   (c) a measurement electrical potential indicative of chloride concentration in the sample fluid.

3. The cartridge assembly of claim 1, wherein the sample well is adapted to retain the sample fluid due to the effect of surface tension.

4. The cartridge assembly of claim 1, further comprising a cover adapted to seal the sample fluid within the sample well when placed on the cartridge assembly.

5. The cartridge assembly of claim 1, wherein the housing is between about 0.5 cm and about 2 cm in length, between about 0.35 cm and about 1.5 cm in width, and between about 0.1 cm and about 0.4 cm in depth.

6. The cartridge assembly of claim 1, further comprising one or more additional measurement transducers positioned within the sample well and embedded in the housing, wherein each of the one or more additional measurement transducers is configured to generate a measurement electrical potential based upon contact with the sample fluid in the sample well.

* * * * *